(12) United States Patent
Minnich

(10) Patent No.: US 7,853,707 B2
(45) Date of Patent: Dec. 14, 2010

(54) METHODS AND SYSTEMS FOR EXTENSIBLE LINK LEVEL ALIGNMENT BETWEEN MODULES IN A DISTRIBUTED PROCESSING SYSTEM

(75) Inventor: David Wayne Minnich, Hillsborough, NC (US)

(73) Assignee: Tekelec, Morrisville, NC (US)

( * ) Notice: Subject to any disclaimer, the term of this patent is extended or adjusted under 35 U.S.C. 154(b) by 2057 days.

(21) Appl. No.: 10/789,598

(22) Filed: Feb. 27, 2004

(65) Prior Publication Data

US 2005/0198101 A1 Sep. 8, 2005

(51) Int. Cl.
G06F 15/16 (2006.01)
(52) U.S. Cl. .................. 709/230; 370/252
(58) Field of Classification Search .............. 709/230
See application file for complete search history.

(56) References Cited

U.S. PATENT DOCUMENTS

| | | | |
|---|---|---|---|
| 6,510,141 B1 | | 1/2003 | Ramfelt et al. |
| 6,757,250 B1 * | | 6/2004 | Fayad et al. ............. 370/235.1 |
| 6,760,343 B1 * | | 7/2004 | Krishnamurthy et al. .... 370/466 |
| 6,959,076 B2 * | | 10/2005 | Chang et al. ........... 379/207.02 |
| 6,990,089 B2 * | | 1/2006 | Benedyk et al. ............. 370/338 |
| 7,496,671 B2 * | | 2/2009 | Engel et al. ................. 709/230 |
| 2001/0030957 A1 * | | 10/2001 | McCann et al. ............ 370/351 |
| 2002/0057713 A1 * | | 5/2002 | Bagchi et al. ............... 370/468 |
| 2002/0059469 A1 | | 5/2002 | Gray, III et al. |
| 2002/0105969 A1 * | | 8/2002 | Benedyk et al. ............. 370/466 |
| 2002/0186723 A1 * | | 12/2002 | Sprague et al. ............. 370/524 |
| 2005/0097212 A1 * | | 5/2005 | Engel et al. ................. 709/230 |
| 2006/0050680 A1 * | | 3/2006 | Naim et al. ................. 370/352 |

FOREIGN PATENT DOCUMENTS

EP 1 161 038 A2 5/2001

OTHER PUBLICATIONS

Eagle STP Platform, Tekelec, Publication 908-0126-01, Rev. A (Copyright 1997).

* cited by examiner

*Primary Examiner*—Thu Nguyen
*Assistant Examiner*—Tauqir Hussain
(74) *Attorney, Agent, or Firm*—Jenkins, Wilson, Taylor & Hunt, P.A.

(57) ABSTRACT

Methods and systems for link-level alignment between processing modules or cards and distributed processing system are disclosed. According to one method, cards that support link level communications parameter negotiation exchange link status signal units (LSSUs) to negotiate a common set of link level communications. For link level communications between a card that supports parameter negotiation and a card that does not support link level communications parameter negotiation, LSSUs are exchanged, and the cards establish link level communications using a default set of parameter values.

19 Claims, 11 Drawing Sheets

METHODS AND SYSTEMS FOR EXTENSIBLE LINK LEVEL ALIGNMENT BETWEEN MODULES IN A DISTRIBUTED PROCESSING SYSTEM

TECHNICAL FIELD

The present invention relates to methods and systems for link level alignment between modules in a distributed processing system. More particularly, the present invention includes methods and systems for extensible link-level alignment between processing modules in a distributed processing system.

BACKGROUND ART

In distributed processing systems where multiple separated processor cards communicate with each other, the cards must be aware of each other and must know how to communicate with each other at the link level. In one distributed processing system marketed by the assignee of the present application as the Eagle® STP Platform, the process by which processor cards discover the presence of other cards connected to a common bus is referred to as alignment. According to the alignment process, each card in the distributed processing system exchanges messages with other cards in the system to determine the presence of every other card. Once the alignment message exchange is complete, the cards can communicate with each other.

FIG. 1 is a block diagram of a conventional signal transfer point in which alignment may be performed. In FIG. 1, signal transfer point 100 includes a plurality of link interface modules 102, a data communications module (DCM) 104, database services module (DSM) 106, and maintenance and administration subsystem processors (MASPs) 108. Modules 102, 104, 106, and 108 are connected by a dual ring, counter rotating bus 110. This bus is referred to as the interprocessor message transport (IMT) bus.

Each module illustrated in FIG. 1 may include an application processor and a communications processor. The application processor associated with each module performs a telecommunications function, such as routing for LIMs 102, converting between SS7 and IP for DCM 104, database services for DSMs 106, and maintenance and administration functions for MASPs 108. In addition, each processing module may include a communications processor for communicating with other processing modules via bus 110. The function of the communications processor is to send and receive messages to and from other processing modules over bus 110 and to perform card alignment.

When deploying multiple cards within the platform illustrated in FIG. 1, the alignment process enables each card to discover other cards that are present on IMT bus 110 and enables the card to establish a communications path with those cards via IMT bus 110. Such a communications path is referred to herein as an IMT virtual circuit (IVC). The alignment process may occur when a card that has been disconnected from IMT bus 110 for any reason is reconnected to IMT bus 110 or when a new card is added to IMT bus 110. Alignment may occur continuously to establish communications between existing cards and new cards as new cards are connected to IMT bus 110.

In current IMT implementations, IMT virtual circuits managed by a given communications processor use the same set of link level communications protocol parameters, regardless of the type of card on the other end of the IVC. In order to upgrade the link level communications capabilities of any card in the system, all cards must be configured to include the same upgrade. This restriction prevents the introduction of changes which might be beneficial for certain card-type pairings, but which should not be used for other card-type pairings.

Current Alignment Process

The current IMT alignment process used in the Eagle® STP is enabled by the exchange of defined signal unit types, referred to as link status signaling units (LSSUs). While these card alignment LSSUs share the same name as SS7 LSSUs used to align links in the SS7 network, the similarity ends there, as the packets have different formats and purposes.

In SS7 networks, there are three types of LSSUs: alignment requests (ARQs), alignment grants (AGRs), and alignment grant acknowledgements (AGAs). FIG. 2 illustrates an LSSU format used in current card alignment procedures. In FIG. 2, LSSU 200 includes a start of message field 202, a safety count field 204, a destination address field 206, a sequence number field 208, a bus indicator/signal unit type field 210, an origination address field 212, length fields 214 and 216, and a subtype field 218. In performing card alignment in conventional STPs, at present, LSSUs sourced by a processor include a length field of 0x01, which corresponds to the length of an LSSU with no payload. Because the cards are incapable of exchanging capabilities information, the LSSUs carry no payload.

FIG. 3 illustrates messages exchanged in the current IMT alignment process. Referring to FIG. 3, when card A desires to align with card B, card A sends an ARQ LSSU destined for card B. The ARQ LSSU does not include a payload. In response to receiving the ARQ LSSU, if card B is present, card B responds by sending an AGR LSSU to card A. The AGR LSSU does not include a payload. In response to the AGR LSSU, card A sends an AGA LSSU to card B. The AGA LSSU does not include a payload. Once the messages illustrated in FIG. 3 have been exchanged, the cards are in a state of alignment with each other and data exchange may commence on the IMT virtual circuit associated with the cards.

One problem with the alignment mechanism illustrated in FIG. 3 is that the set of parameters or algorithms used by each card in the system to communicate with other cards via the IMT bus is limited to the set of parameters common to the oldest or least-capable card in the system. For example, algorithms for reliable, sequenced delivery, timer values for retransmission, retransmission algorithms, buffering on the link, and data exchange rate between cards are parameters that the cards use to control link level communications with each other. If a new card with extended parameters is attached to the bus and an old card is present on the bus, because each card establishes an IMT virtual circuit with every other card and there is no capability of exchanging parameters for each IMT virtual circuit, the new card is limited to the set of parameters common to the oldest card in the system. Accordingly, in light of these difficulties associated with conventional card alignment, there exists a need for improved methods and systems for processing module or card alignment in a distributed processing system.

DISCLOSURE OF THE INVENTION

According to one aspect, the present invention includes methods and systems for link level alignment of processor cards in a distributed processing system. As used herein, the phrase "link level alignment" refers to the process by which cards establish communications with other cards at the link level. Previously, such alignment included discovery of other cards followed by communication using a default set of parameters. According to the present invention link level alignment may include negotiation of link level communications parameters. Such negotiation allows differential alignment between sets of cards according to the capabilities of each card set. For example, using the link level communications protocol parameter negotiation methods described herein, card A may align with card B to use a first link level communications protocol parameter set. Card A may align with card C to use a second link level communications parameter set different from the first link level communications parameter set. Such differential alignment capabilities allows older cards to co-exist with newer cards without requiring the newer cards to downgrade to the link level communications capabilities of the older cards when communicating with each other.

One method for extensible link level alignment includes periodically sending, from a first processor card, alignment request messages to addresses on a communication bus for cards with which communications have not been established. The alignment request messages may be independent of demands from higher protocol layers. In each alignment request message, the sending processor card may include minimum and maximum link level communications protocol versions supported. Each card that receives the alignment request message and that supports link level communications parameter negotiation may send an alignment grant message including the highest common version and parameter ranges for that version. In response to the alignment grant message, the receiving card sends an alignment grant acknowledgement message with parameters selected from the ranges in the alignment grant message. After the sending card receives the alignment grant acknowledgement message communications can proceed based on the agreed upon set of parameters. Thus, because the present invention allows link level communications parameter negotiation between processor cards in a distributed processing environment, cards with different link level communications capabilities can communicate with each other according to an agreed upon link level communications parameter set.

As used herein, the terms "link level communications parameters" and "link level communications parameter set" refer to a set of one or more link level communications parameters that processor cards use to communicate with each other at the link level. Exemplary link level communications parameters that may be exchanged between processor cards include retransmission timer values, retransmission algorithms, link level communications protocol or protocol software version, maximum data rate or any other parameter used for link level communications between processors.

The link level alignment methods described herein may use the existing LSSU exchange mechanism but extend this mechanism to include the negotiation of a basic set of capabilities, identified by a link level communications protocol version and specific values for parameters/algorithms identified by that version. Any two cards that support a given link level communications protocol version understand the same language and can consequently use that language to negotiate any additional parameters that may be necessary. One exemplary implementation relies on the fact that, in the current system, the LSSU length value (i.e., Len1 and Len2 parameters) is 0x01 and is not checked unless a processing module supports link level communications parameter negotiation. Processing modules that support link level communications parameter negotiation may rely on the fact that any LSSU with a length of 0x01 was generated by a processing module that does not support link level communications parameter negotiation.

By definition, processing modules that do not support link level communications parameter negotiation are said to support link level communications protocol version 0. For processing modules that support parameter negotiation, LSSUs used in link alignment may have lengths greater than 0x01, since the LSSUs carry link level communications parameters being negotiated.

As used herein, processing modules or cards that support link level communications parameter negotiation are referred to as non-legacy cards. Processing modules or cards that do not support parameter negotiation are referred to as legacy cards. Since legacy cards ignore payloads in LSSUs being exchanged for alignment, legacy cards can coexist in the same distributed processing system with non-legacy cards. In such a system, link level communications between non-legacy cards will occur using negotiated parameters. Link level communications between a legacy card and a non-legacy card will occur using a default set of parameters recognized by the legacy card. Finally, link level communications between legacy cards will occur using the default set of parameters.

Thus, the present invention allows non-legacy cards and legacy cards to coexist and communicate in a system without requiring that all cards communicate with the lowest common set of parameters. Using LSSUs, non-legacy cards can negotiate a parameter set for enhanced link level communications capabilities as compared to those of legacy cards. When a non-legacy card seeks to align with a legacy card, the non-legacy card will recognize that the legacy card is a legacy card when the non-legacy card receives an LSSU without a payload. In that instance, the non-legacy card will communicate with that legacy card using the default set of link level communications parameters. Non-legacy cards align themselves with each other using LSSUs without payloads as described above.

Accordingly, it is an object of the invention to provide methods and systems for aligning processing modules or cards in a distributed processing environment.

It is another object of the invention to provide methods and systems for aligning processor cards in a distributed processing environment in a manner that is both backwards and forward compatible.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 4:
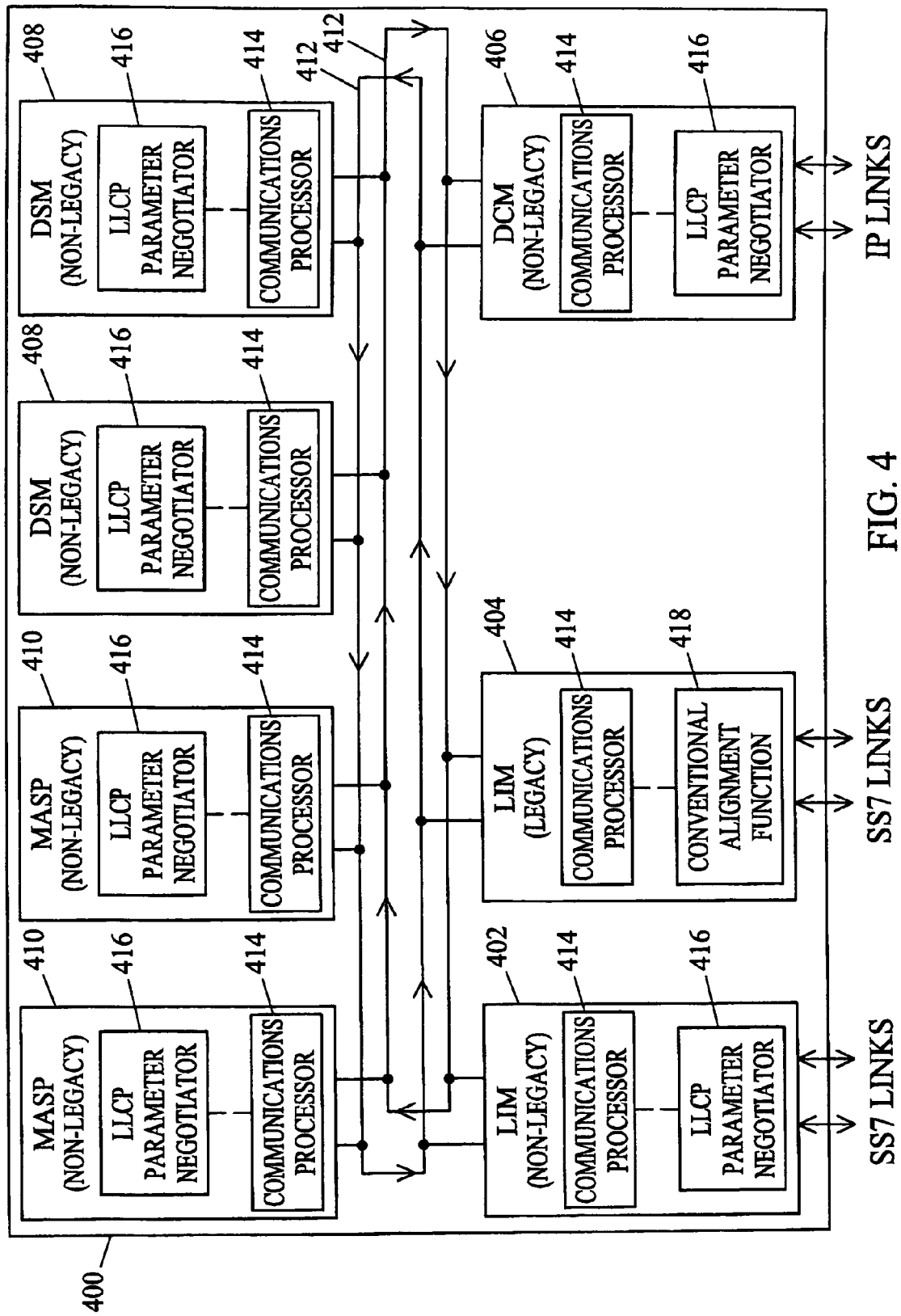
FIG. 4 is a block diagram of a signal transfer point including extensible link level alignment functionality according to an embodiment of the present invention.

The methods and systems for link level card alignment according to the present invention may be implemented on any suitable hardware platform with a distributed processing architecture in which processing modules establish link level connections with other processing modules. FIG. 4 is a block diagram illustrating an exemplary signal transfer point with a distributed processing architecture on which embodiments of the present invention may be implemented. Referring to FIG. 4, signal transfer point 400 includes link interface modules 402 and 404, data communications module 406, database services modules 408, and maintenance administration subsystem processors 410. Modules 402,404,406,408, and 410 are connected via IMT bus 412. In the illustrated example, each module includes a communications processor 414 for communicating with other processing modules via IMT bus 412.

According to the present invention, at least some of the modules in STP 400 include a link level communications protocol (LLCP) parameter negotiator 416 for individually negotiating link level communications parameters with other modules. Link level communications protocol parameter negotiators 416 preferably operate independently of application layer functions on the various modules. That is, parameter negotiators 416 periodically send alignment request messages to a set of card bus addresses independently of whether an application on a card has data to send. The card bus addresses may include addresses of card slots on the bus with which the sending card has not yet aligned. If a new card is plugged into a previously empty card slot on the bus corresponding to one of the addresses, the alignment message exchange will occur immediately and independently of any application data that the new card has to send. Such application-independent alignment decreases the time required for new cards to become fully operational.

Link level communications protocol parameter negotiators 416 are capable of negotiating link level communications parameters between modules that have parameter negotiation ability. In addition, link level communications parameter negotiators 416 are capable of forming link level connections between modules that do not have link level communications parameter negotiation capabilities. In the example illustrated in FIG. 4, link interface module 404 includes a conventional alignment function 418. Accordingly, link interface module 404 is a legacy module.

Figure 5A:
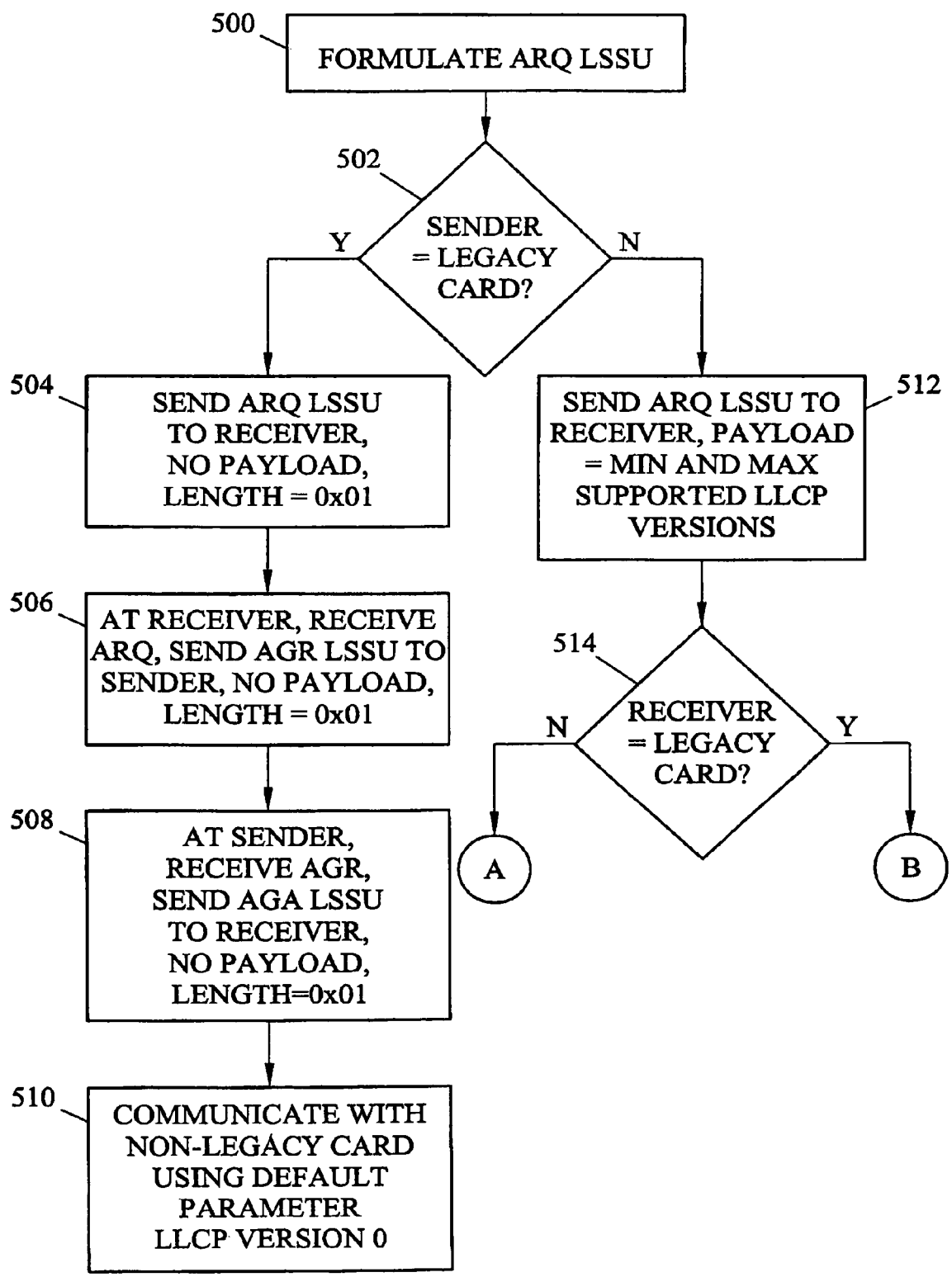
FIGS. 5A and 5B are a flow chart illustrating exemplary steps for extensible link level alignment according to an embodiment of the present invention.
Figure 5B:
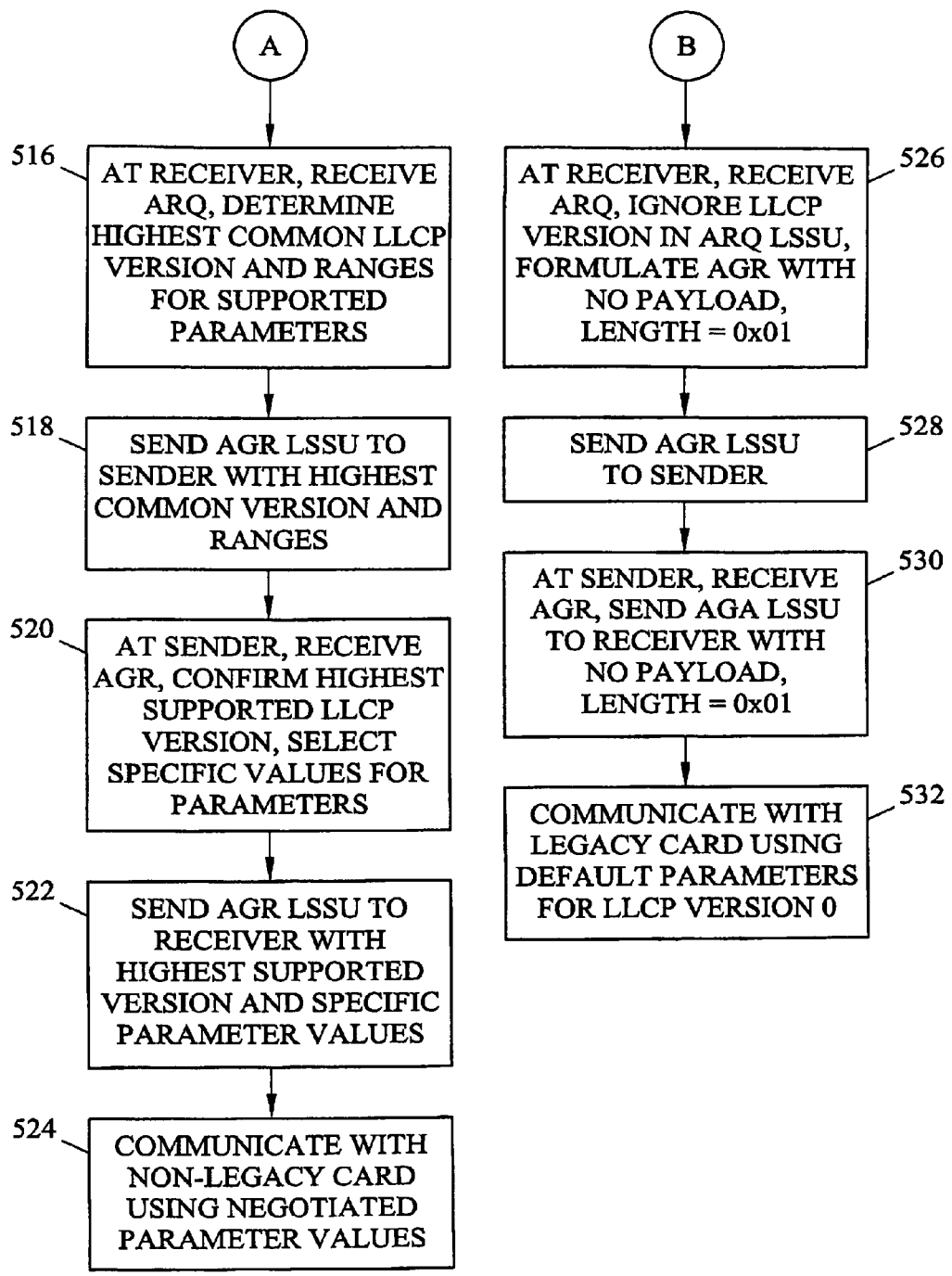

FIGS. 5A and 5B are a flow chart illustrating exemplary steps performed by link level communications protocol parameter negotiators 416 and by conventional alignment function 418 in performing link level alignment between cards according to an embodiment of the present invention. Referring to FIG. 5A, in step 500, the card seeking to perform alignment, referred to in FIGS. 5A and 5B as the sender, formulates an ARQ LSSU. In step 502, if the sender is a legacy card, control proceeds to step 504 where the sender sends an ARQ to the receiver. In the ARQ, no payload is included and the length value is set to 0x01. In step 506, the receiver receives the ARQ message. Regardless of whether the receiver is a legacy card or a non-legacy card, the receiver sends an AGR LSSU to the sender. The AGR LSSU includes no payload and a length value of 0x01.

In step 508, the sender receives the AGR LSSU and sends an AGA LSSU to the sender. The AGA LSSU includes no payload and a length value of 0x01. In step 510, link level communications between the sender and the receiver can commence using default parameters for link level communications protocol version 0.

Returning to step 502, if the sender is not a legacy card, control proceeds to step 512 where the sender sends an ARQ LSSU to the receiver. In the ARQ LSSU, the sender includes minimum and maximum supported link level communications protocol versions. In step 514, if the receiver is not a legacy card, control proceeds to step 516 in FIG. 5B where the receiver receives the ARQ and determines the highest common link level communications protocol version with the sender and ranges for supported parameter values. In step 518, the receiver sends an AGR LSSU to the sender. The AGR LSSU includes the highest common link level communications protocol version and ranges for the parameter values. In step 520, the sender receives the AGR, confirms the highest supported link level communications protocol version and selects specific values for the parameters that are within the ranges received from the receiver. In step 522, the sender sends an AGA LSSU to the receiver. The AGA LSSU includes the supported version and parameter values selected from the ranges supported by the receiver. In step 524, communications between the non-legacy cards can commence using the negotiated parameter values.

Returning to step 514 in FIG. 5A, if the sender is a non-legacy card and the receiver is a legacy card, control proceeds to step 526 in FIG. 5B where the receiver receives the ARQ message with the minimum and maximum supported link level communications protocol versions. The receiver ignores the communications protocol versions and formulates an AGR LSSU with no payload and a length of 0x01. In step 528, the receiver sends the AGR LSSU to the sender. In step 530, the sender receives the AGR LSSU and sends an AGA LSSU to the receiver. The AGA LSSU includes no payload and a length value of 0x01. In step 532, communications between the non-legacy card and the legacy card commence using default parameters for link level communications protocol version 0.

Thus, using the steps illustrated in FIGS. 5A and 5B, link level alignment between cards can occur without requiring all cards in the system to communicate using the same link level communications protocol parameter values. Non-legacy cards can communicate with each other using negotiated parameter values. Non-legacy cards can communicate with legacy cards using default parameter values common to the legacy cards. Finally, legacy cards can communicate with other legacy cards using the default parameter values.

Figure 6:
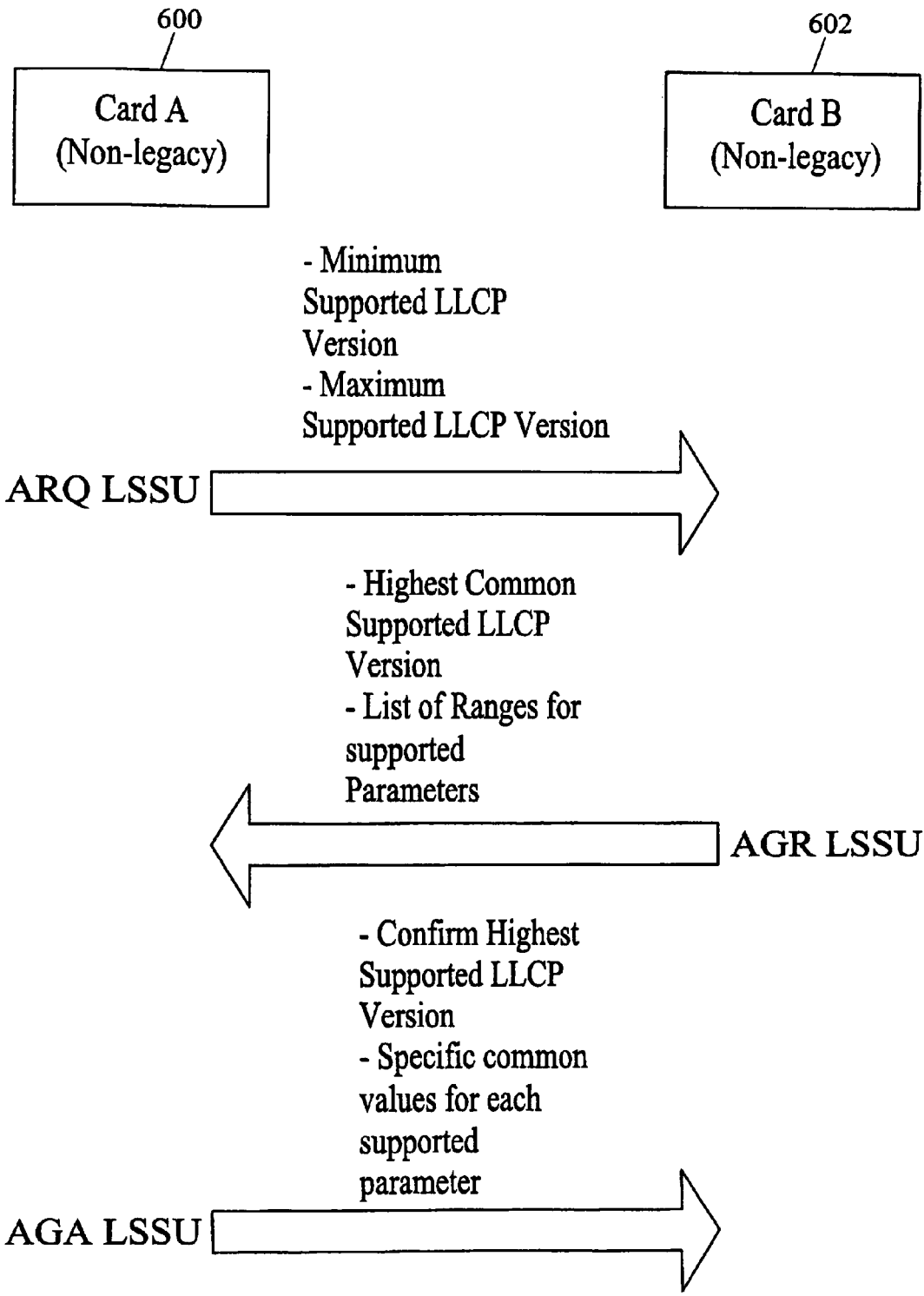
FIG. 6 is a message flow diagram illustrating exemplary messages exchanged between non-legacy cards in performing link level alignment according to an embodiment of the present invention.

FIG. 6 is a message flow diagram illustrating exemplary messages exchanged in performing link level alignment between non-legacy cards. Referring to FIG. 6, a non-legacy card 600 sends an ARQ LSSU to another non-legacy card 602. The ARQ LSSU includes the minimum and maximum supported link level communications protocol versions. In response to the ARQ LSSU, non-legacy card 602 selects the highest common supported link level communications protocol version and includes a list of ranges of supported parameters in an AGR LSSU. Non-legacy card 602 sends the AGR LSSU to non-legacy card 600. In response to receiving the AGR LSSU, non-legacy card 600 selects the highest supported link level communications protocol version and selects specific parameter values within the ranges. Non-legacy card 600 then sends an AGA LSSU to non-legacy card 602 including the confirmed highest supported link level communications protocol version and the selected parameter values. After the AGA LSSU has been sent, communications between non-legacy cards 600 and 602 can commence using the negotiated parameter values.

The present invention is not limited to selecting the highest common link level communications protocol version when performing alignment between non-legacy cards. The receiving non-legacy card may select any protocol version within the range of protocol versions received from the non-legacy card without departing from the scope of the invention. For example, it may be desirable to select a lower protocol version for testing purposes.

Figure 7:
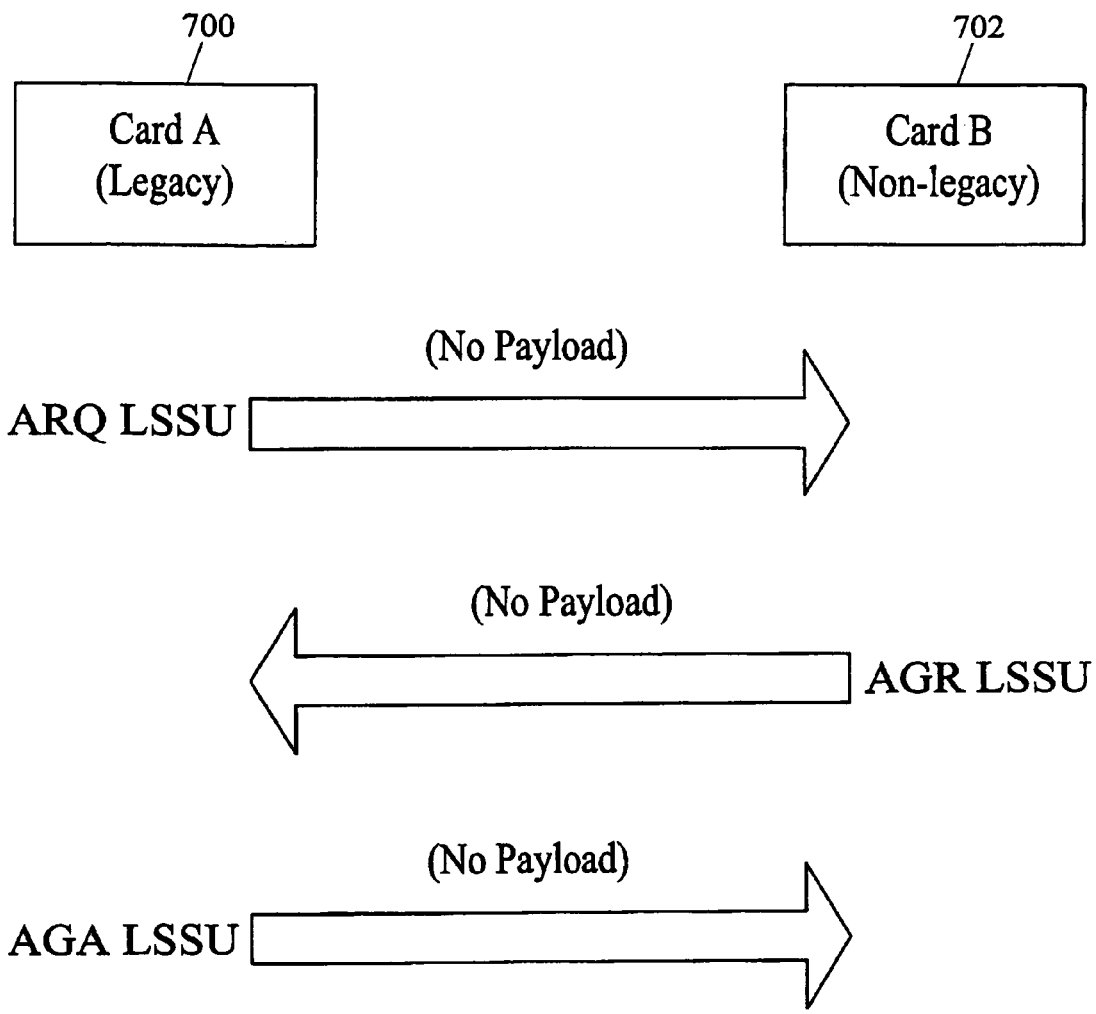
FIG. 7 is a message flow diagram illustrating exemplary messages exchanged when a legacy card seeks to align with a non-legacy card according to an embodiment of the present invention.

FIG. 7 is a message flow diagram illustrating exemplary messages exchanged when a legacy card seeks to align with a non-legacy card. Referring to FIG. 7, in order to initiate the alignment, legacy card 700 sends an ARQ LSSU to non-legacy card 702. The ARQ LSSU includes a length value of 0x01 and no payload. When non-legacy card 702 receives the ARQ, it determines, based on the length value, that the request is from a legacy card that is only capable of supporting link level communications protocol version 0. As a result, non-legacy card 702 formulates an AGR LSSU with no payload and a length value of 0x01. In response to the AGR LSSU, legacy card 700 formulates an AGA LSSU with no payload a length of 0x01 and sends the AGA LSSU to non-legacy card 702. After the AGA LSSU, link level communications between legacy card 700 and non-legacy card 702 can commence using the parameters common to link level communications protocol version 0.

Figure 8:
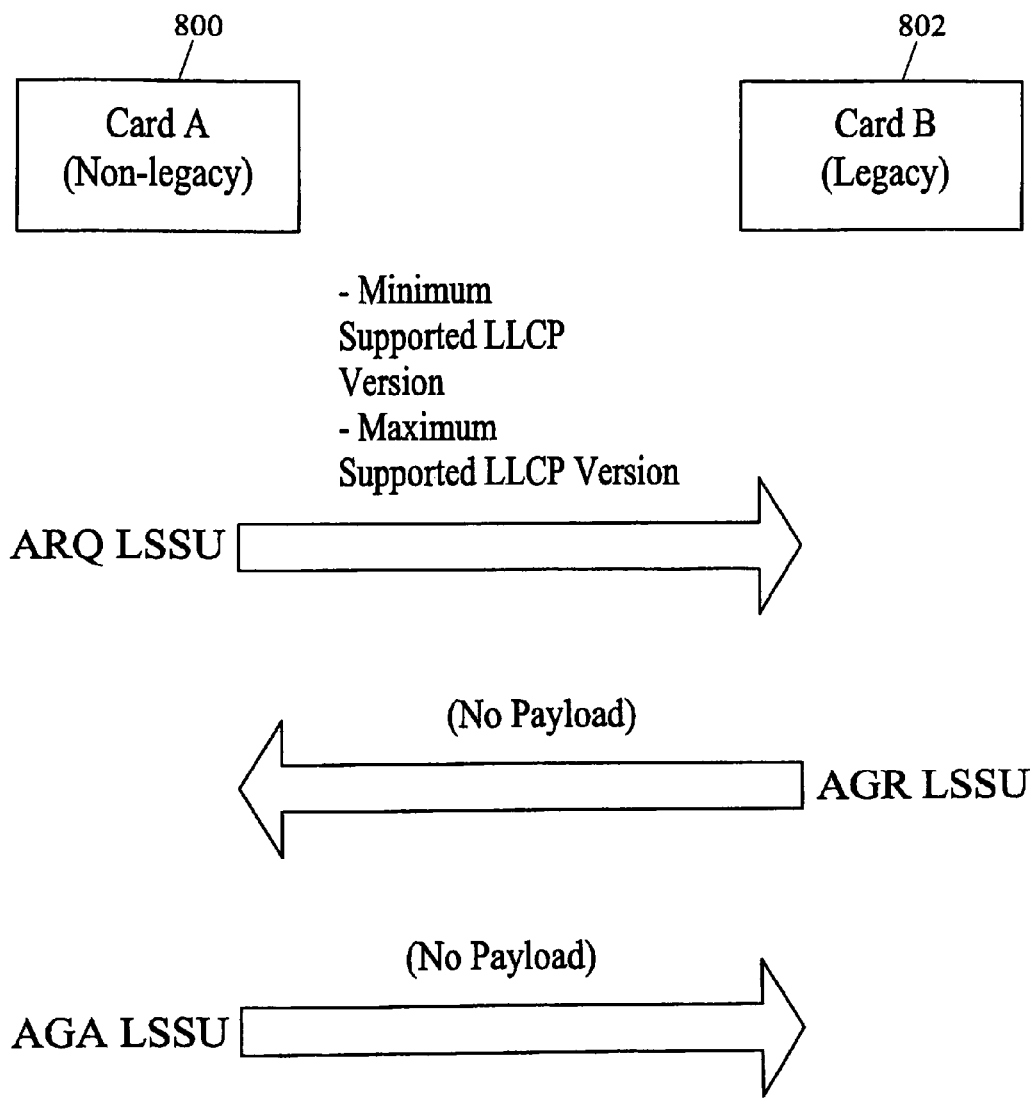
FIG. 8 is a message flow diagram illustrating exemplary messages exchanged when a non-legacy card seeks to align with a legacy card according to an embodiment of the present invention.

FIG. 8 is a message flow diagram illustrating messages exchanged when a non-legacy card seeks to align with a legacy card. Referring to FIG. 8, a non-legacy card 800 initiates the alignment transaction by sending an ARQ LSSU to a legacy card 802. In the ARQ LSSU, non-legacy card 800 includes the minimum and maximum supported link level communications protocol versions. In response to receiving the ARQ LSSU, because legacy card 802 does not support link level communications protocol parameter negotiation, legacy card 802 simply ignores the minimum and maximum link level communications protocol versions. That is, legacy card 802 treats the ARQ as being part of the standard alignment process and sends an AGR LSSU to non-legacy card 800. When non-legacy card 800 receives the AGR LSSU, it determines that card 802 is a legacy card. As a result, non-legacy card 800 sends an AGA LSSU with no payload to legacy card 800. After the AGA LSSU, non-legacy card 800 and legacy card 802 can communicate using the default set of parameters corresponding to link level communications protocol version 0.

Figure 1:
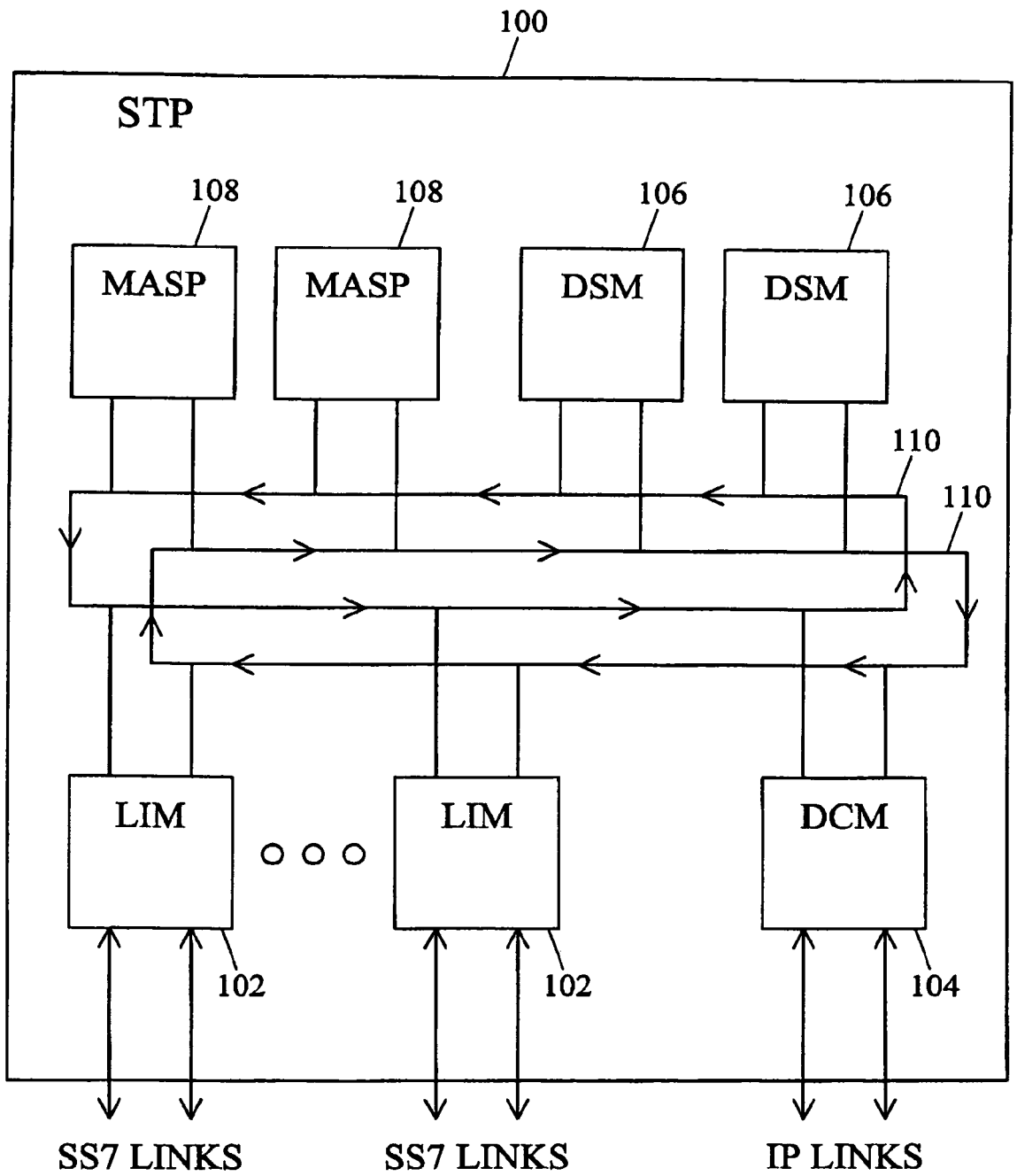
FIG. 1 is block diagram of a conventional signal transfer point including a distributed internal processing architecture.
Figure 2:
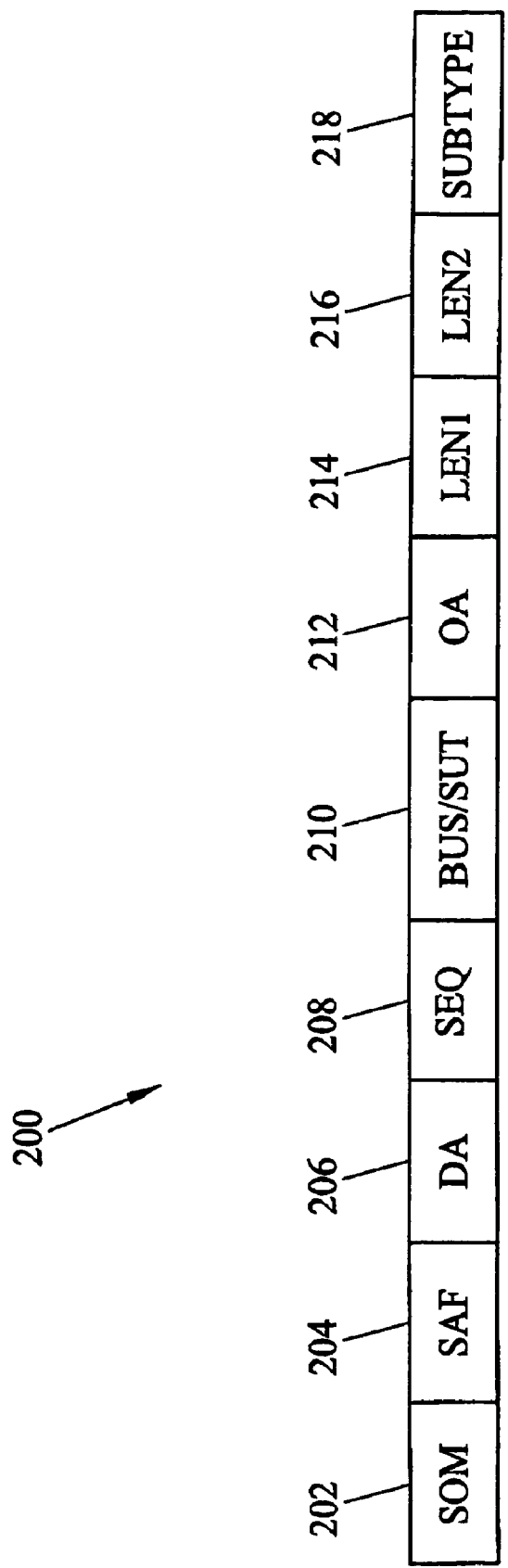
FIG. 2 is a block diagram of a conventional LSSU message.
Figure 3:
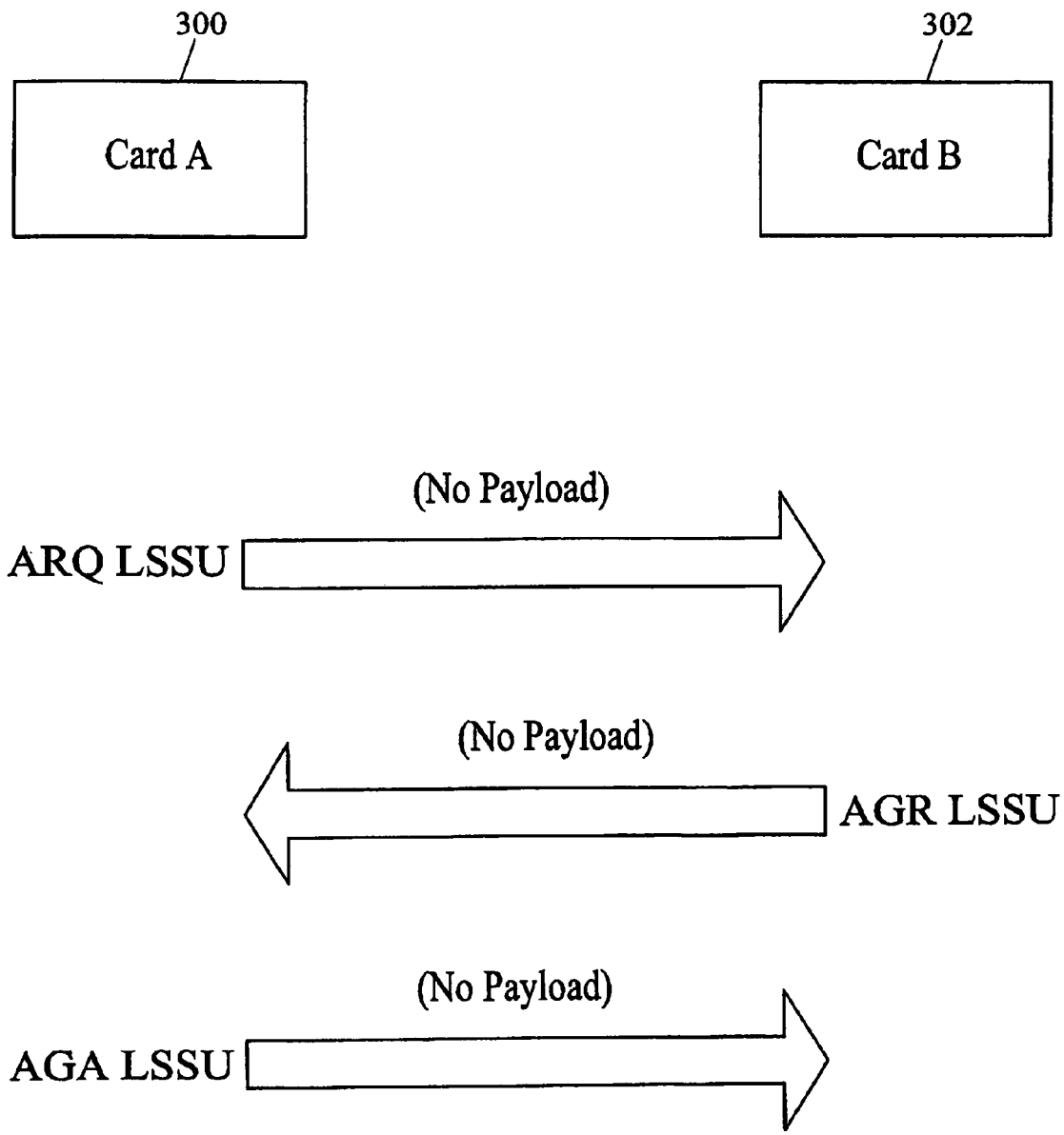
FIG. 3 is a message flow diagram illustrating a conventional alignment mechanism used to align cards in the STP illustrated in FIG. 1.
Figure 9:
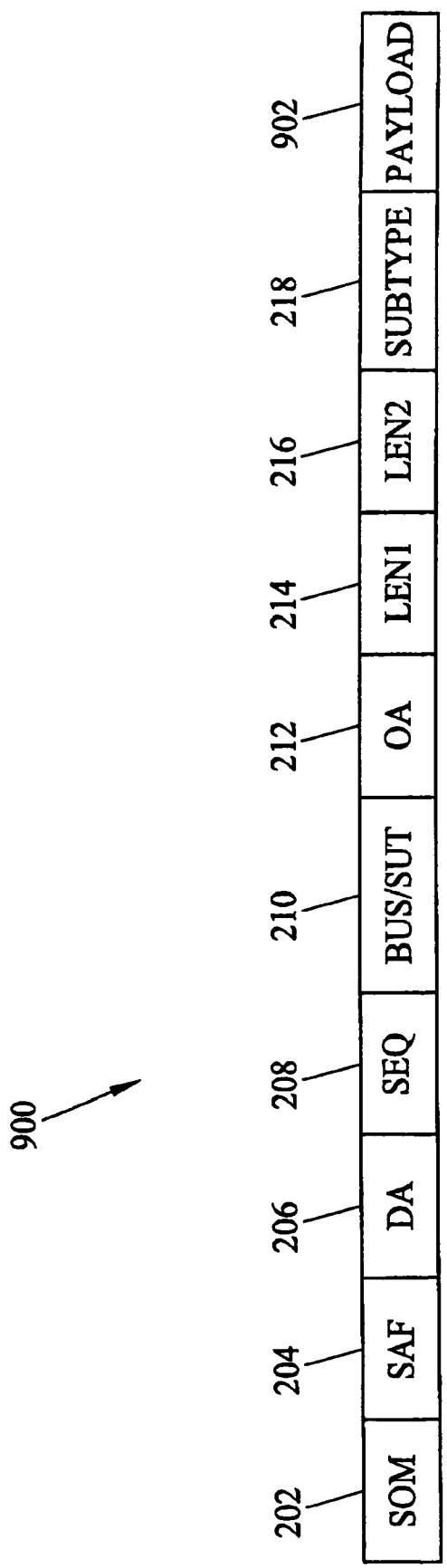
FIG. 9 is a block diagram illustrating an exemplary LSSU for carrying link level communications parameters being negotiated between cards during link level alignment according to embodiment of the present invention.

As indicated above, non-legacy cards that support link level communications protocol parameter negotiation send new parameters that were not previously included in LSSUs. FIG. 9 is a block diagram illustrating an exemplary LSSU format that may be used by link level communications parameter negotiators 416 in performing alignment according to an embodiment of the present invention. Referring to FIG. 9, LSSU 900 includes fields 202-218, which are the same as the correspondingly numbered fields illustrated in FIG. 2. In addition, LSSU 900 includes a payload field 902 that carries the link level communications protocol versions and parameters associated with the link level communications protocol versions. When carrying a payload, length fields 214 and 216 are preferably set to a value equal to 0x01 plus the length of the payload.

Figure 10:
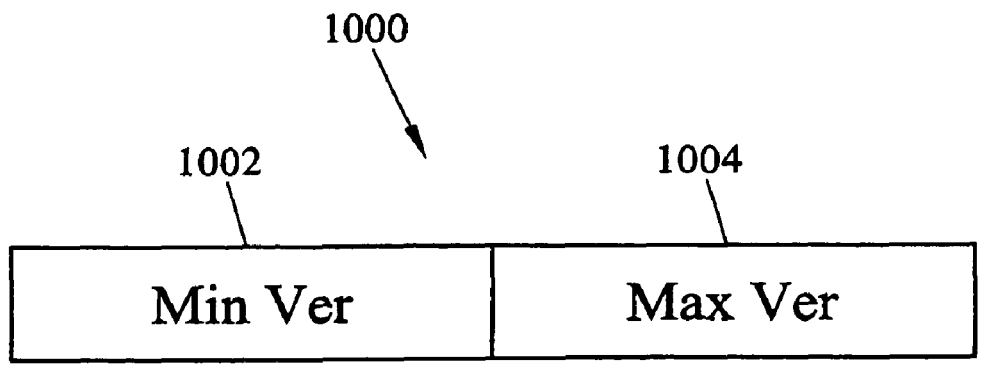
FIG. 10 is a block diagram illustrating an exemplary payload carried in an ARQ message during link level alignment according to an embodiment of the present invention.

FIG. 10 is a block diagram of the payload for an ARQ message sent by a non-legacy card seeking to perform alignment according to an embodiment of the present invention. Referring to FIG. 10, ARQ payload 1000 includes a minimum link level communications protocol version 1002 and a maximum link level communications protocol version 1004. As discussed above, the minimum and maximum link level communications protocol version fields may identify software versions executable by the communications processors for communicating with other processors via the IMT bus. Providing minimum and maximum link level communications protocol version fields in ARQ messages allows cards to communicate with each other using a negotiated protocol version.

Figure 11:
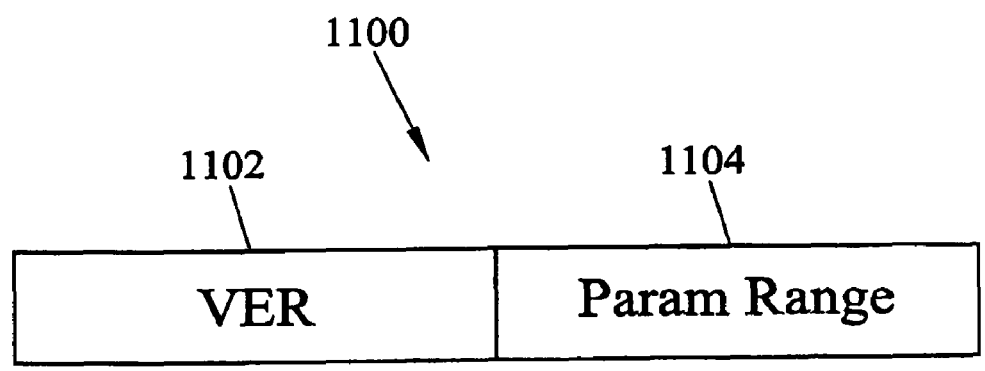
FIG. 11 is a block diagram illustrating an exemplary payload carried in an AGR message during link level alignment according to an embodiment of the present invention.

FIG. 11 is a block diagram illustrating an exemplary payload that may be included in an AGR message sent by a non-legacy card according to an embodiment of the present invention. Referring to FIG. 11, payload 1100 includes a version field 1102 and a parameter range field 1104. Version field 1102 carries the version of the link level communications protocol accepted by the receiver. Parameter range field 1104 stores a data structure specific to the link level communications protocol version which includes supported ranges of parameter values specific to the link level communications protocol version. Examples of parameters that may be included in range field 1104 include timer values for retransmission, retransmission algorithm, the amount of buffering on a link, the rate at which a card can send or receive data, and sequencing and retransmission algorithm. The present invention is not limited to these particular parameters. Any parameters that may be used for link level communications between processors can be exchanged and negotiated using the methods described herein without departing from the scope of the invention.

Figure 12:
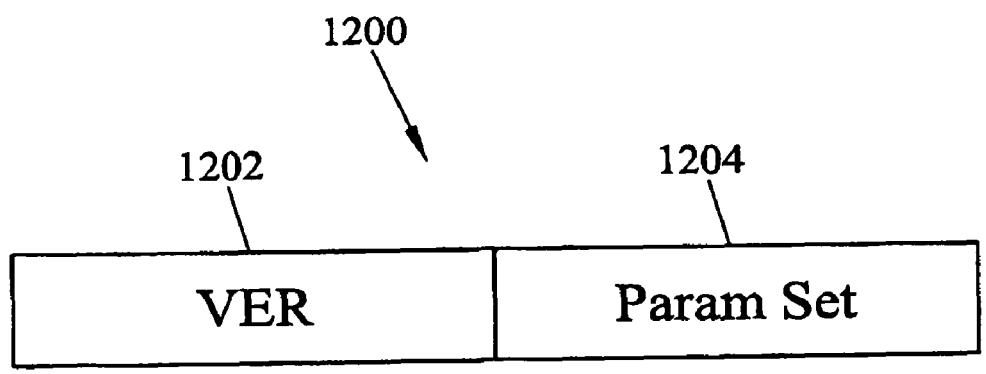
FIG. 12 is a block diagram illustrating an exemplary payload carried in an AGA message during link level alignment according to embodiment of the present invention.

In response to the AGR message, the sender sends an AGA message that confirms the specific parameter values and link level communications protocol version. FIG. 12 is a block diagram of the LSSU payload for the AGA message according to an embodiment of the present invention. Referring to FIG. 12, AGA payload includes a version field 1202 and a parameter set field 1204. Version field 1202 identifies the link level communications protocol version upon which the cards have agreed. Parameter set field 1204 stores the parameter set for the particular link level communications protocol version.

CONCLUSION

The link level communications alignment framework described herein provides significant flexibility for future link level communications growth. By introducing the concept of negotiated link level communications protocol version, the methods and systems described herein provide for varying parameter sets from card-to-card, as well as potentially different link level communications algorithms to be used on certain IVCs. In addition, although examples described above use the existing LSSU subtypes, the present invention is not limited to using these subtypes to perform link level communications parameter negotiation. For example, the existing LSSU subtypes can be used for the basic alignment message exchange, as described above. In the initial exchange, non-legacy cards can agree on a different communications protocol with different packet formats for subsequent link level communications parameter negotiation. Any suitable packet-based communications protocol for exchanging link level communications parameters is intended to be within the scope of the invention. One example of such a protocol is Ethernet.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for link level alignment of processor cards in a distributed processing environment, the method comprising:
   (a) at a first processor card within a telecommunications signaling platform, sending an alignment request message to a second processor card within a telecommunications signaling platform;
   (b) including, in the alignment request message, at least one link level communications protocol version supported by the first processor card;
   (c) at the second processor card, receiving the alignment request message, selecting a link level communications protocol version based on the version in the alignment request message and parameter values for that version;
   (d) sending an alignment grant message from the second processor card to the first processor card including the selected link level communications protocol version and the parameter values;
   (e) at the first processor card, receiving the alignment grant message, selecting link level communications parameter values based on the parameters in the alignment grant message and sending an alignment grant acknowledgement message including the selected parameter values to the second processor card; and
   (f) sending messages between the first and second processor cards using the selected link level communications protocol version and parameter values, sending messages between the first processor card and a third processor card using a link level communications protocol version and parameters that are different from the link level communications protocol and version used for link level communications between the first and second processor cards and wherein steps (a)-(f) are performed by SS7 link interface modules in a signal transfer point.

2. The method of claim 1 wherein sending an alignment request message includes sending an alignment request (ARQ) link status signal unit (LSSU) including a payload, the payload including the link level communications protocol version.

3. The method of claim 1 comprising sending an alignment grant message from the first processor card to the third processor card within the telecommunications signaling platform, wherein the third processor card does not support link level communications protocol parameter negotiation.

4. The method of claim 3 comprising, at the third processor card, formulating an alignment grant message and forwarding the alignment grant message to the first processor card.

5. The method of claim 4 wherein sending messages between the first and third processor cards includes using a default set of link level communications protocol parameters supported by the first and third processor cards.

6. The method of claim 1 wherein step (a) occurs independently of application data that the first processor card has to send.

7. A method for negotiating link level communications parameters between processor cards in a telecommunications signaling platform, the method comprising:
   (a) exchanging messages between first and second processor cards for establishing link level communications between the first and second processor cards, the messages including link level communications protocol parameters supported by the first and second processor cards;
   (b) agreeing on a common set of link level communications protocol parameters usable by the first and second processor cards;
   (c) establishing link level communications between the first and second processor cards using the common set of parameters; and
   (d) establishing link level communications between the first and a third processor card using a link level communications protocol and parameters different from those used for the link level communications between the first and second processor cards, wherein steps (a)-(d) are implemented by SS7 link interface modules within a signal transfer point.

8. The method of claim 7 wherein exchanging messages between first and second processor cards includes exchanging link status signaling units (LSSUs) between the first and second processor cards.

9. The method of claim 7 wherein the link level communications protocol parameters include at least one of a retransmission algorithm and retransmission timers.

10. The method of claim 7 wherein the link level communications protocol parameters include data rates supported by the first and second processor cards.

11. The method of claim 7 wherein exchanging messages between the first and second processor cards includes exchanging the messages independently of application data ready to be sent by the first and second processor cards.

12. The method of claim 7 comprising exchanging messages between the first processor card and the third processor card, wherein the third processor card does not support link level communications parameter negotiation and wherein establishing link level communications between the first and third processor cards includes using a default set of parameters supported by the third processor card.

13. The method of claim 12 wherein exchanging messages between the first and third processor cards includes exchanging link status signal units (LSSUs) between the first and third processor cards.

14. A system for link level alignment of processor cards in a distributed processing system, the system comprising:
   (a) first and second processor cards within a telecommunications signaling platform coupled to a common bus and supporting link level communications parameter negotiation; and (b) a third processor card coupled to the bus and within the telecommunications signaling platform, the third processor card not supporting link level communications protocol parameter negotiation, wherein the first and second processor cards are configured to negotiate link level communications protocol parameters with each other and to communicate with each other using the negotiated parameters and wherein the first and second processor cards communicate with the third processor card using a default set of link level communications protocol parameters supported by the third processor card and wherein the first, second, and third processor cards comprise SS7 link interface modules within a signal transfer point.

15. The system of claim 14 wherein the first, second, and third processor cards comprise SS7 link interface modules or a data communications module for sending and receiving IP telephony signaling messages over IP signaling links.

16. The system of claim 14 wherein the first processor card sends an alignment request message to the second processor card to negotiate a link level communications protocol version.

17. The system of claim 14 wherein the first and second processor cards discover that the third processor card does not support link level communications parameter negotiation by exchanging link status signal units (LSSUs) with the third processor card.

18. The system of claim 17 wherein the first and second processor cards negotiate the link level communications protocol parameters by exchanging LSSUs to negotiate a parameter exchange protocol and to negotiate the parameters using the parameter exchange protocol.

19. The system of claim 17 wherein the first and second processor cards exchange messages for negotiating the link level communications protocol parameters independently of application data ready to be sent by the first and second processor cards.

* * * * *